United States Patent
Chen et al.

(10) Patent No.: US 6,929,878 B2
(45) Date of Patent: Aug. 16, 2005

(54) BATTERY COVER ASSEMBLY FOR A PORTABLE ELECTRONIC DEVICE

(75) Inventors: Jian Wu Chen, Shenzhen (CN); Ying Liang Tu, Shenzhen (CN); Chia-Hua Chen, Tu-Chen (TW)

(73) Assignee: Fih Co., Ltd., Shindian (TW)

(*) Notice: Subject to any disclaimer, the term of this patent is extended or adjusted under 35 U.S.C. 154(b) by 0 days.

(21) Appl. No.: 10/848,490

(22) Filed: May 17, 2004

(65) Prior Publication Data

US 2004/0228072 A1 Nov. 18, 2004

(30) Foreign Application Priority Data

May 16, 2003 (TW) ...................................... 92209065 U

(51) Int. Cl.[7] .............................................. H01M 2/10
(52) U.S. Cl. ...................................................... 429/100
(58) Field of Search ....................... 361/679; 455/575.1, 455/575.2, 575.3, 575.4, 575.5, 575.6, 575.7, 575.8, 575.9, 347–351; 429/96, 100; 220/811–813, 816, 817, 820, 835, 345.1, 345.2

(56) References Cited

U.S. PATENT DOCUMENTS

| | | | |
|---|---|---|---|
| 3,881,961 A | * | 5/1975 | Nation ........................ 429/97 |
| 5,436,088 A | | 7/1995 | Castaneda et al. |
| 6,157,545 A | | 12/2000 | Janninck et al. |
| 6,409,042 B1 | * | 6/2002 | Hirano et al. ............... 220/812 |
| 6,434,325 B1 | * | 8/2002 | Noda et al. ................. 386/118 |

* cited by examiner

*Primary Examiner*—Lynn Feild
*Assistant Examiner*—Corey Broussard
(74) *Attorney, Agent, or Firm*—Wei Te Chung

(57) ABSTRACT

A battery cover assembly includes a battery cover (3) defining a pair of guide rails (326) in an inner surface of the battery cover, a connecting member (2), a housing (1) defining a receiving slot (164) and a battery-receiving compartment (194), a plurality of springs (5, 7), a plurality of sleeves (6), a number of locking pins (7), and an antenna rod (4). The connecting member is loosely received in the guide rails along a lateral direction. Each sleeve includes a first through hole and a second through hole. The connecting member is engaged with each sleeve by using each locking pin inserting into a folded arm of the connecting member and the first through hole, and the antenna rod inserts through the through hole of the sleeve and the receiving slot, such that the battery cover is pivotably connected with the housing.

21 Claims, 6 Drawing Sheets

BATTERY COVER ASSEMBLY FOR A PORTABLE ELECTRONIC DEVICE

BACKGROUND OF THE INVENTION

1. Field of the Invention

The present invention generally relates to battery cover assemblies, and more particularly to a battery cover assembly for use in a portable electronic device.

2. Prior Art

As a power source, batteries are widely used in portable electronic devices, such as personal digital assistants (PDAs), cellular phones and so on. Conventional batteries are attachably received in the electronic devices, and battery covers are designed to connect with housings of the electronic devices to package the batteries. The batteries have to be replaced by opening the battery covers when the batteries are damaged or cannot be recharged with electricity any more.

A clasp structure or latch structure is used with a conventional battery cover to engage with a housing of a portable electronic device. For example, a cellular phone marked Alcatel OT310 has a latch for the battery cover. The latch comprises a pair of hooks at one end of the battery cover and a locking pin protruding from the other end of the battery cover. Accordingly, a pair of troughs is defined in an end portion of a rear side of a housing of the cellular phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the cellular phone. The battery cover is simple in structure, and the engagement between the battery cover and the housing of the cellular phone is firm, too. However, during disassembly, the battery cover is susceptible to being damaged, since a greater force is exerted thereon. As a result, it is inconvenient for a user to change a battery in the housing of the cellular phone.

In addition, most conventional battery covers or battery packages are separate from housings of portable electronic devices. The battery covers need to be opened and taken off when changing batteries, and then the battery covers have to be remounted to the housing after the batteries are changed. During the course of changing the batteries, the disassembled battery covers may be misplaced.

SUMMARY OF THE INVENTION

Accordingly, an object of the present invention is to provide a battery cover assembly which is convenient for a user to open and close, and for which the battery cover is not susceptible to being lost when it is opened.

To achieve the above-mentioned object, a battery cover assembly includes a battery cover, a connecting member, a housing defining a receiving slot along a longitudinal direction thereof, a plurality of springs, at least a sleeve, and an antenna rod secured in the receiving slot. The battery cover has a pair of guide rails defined in an inner side thereof. The connecting member includes a main body, a pair of side wings extending from two sides of the main body, and a folding leg extending downwarly from each side wing. Each sleeve includes a first through hole and a second through hole. The connecting member is engaged with each sleeve by using each locking pin inserting into a folded arm of the connecting member and the first through hole, and the antenna rod inserts through the through hole of the sleeve and the receiving slot, such that the battery cover is pivotably connected with the housing. When the battery cover is rotated downwardly to the housing, a predetermined force is required to press the battery cover down, and then a force is required along a direction toward the antenna rod. The battery cover locks into place on the housing when locking projections on the cover engage into troughs on the housing.

Other objects, advantages and novel features of the invention will become more apparent from the following detailed description when taken in conjunction with the accompanying drawings, in which:

DETAILED DESCRIPTION OF THE INVENTION

Figure 1:
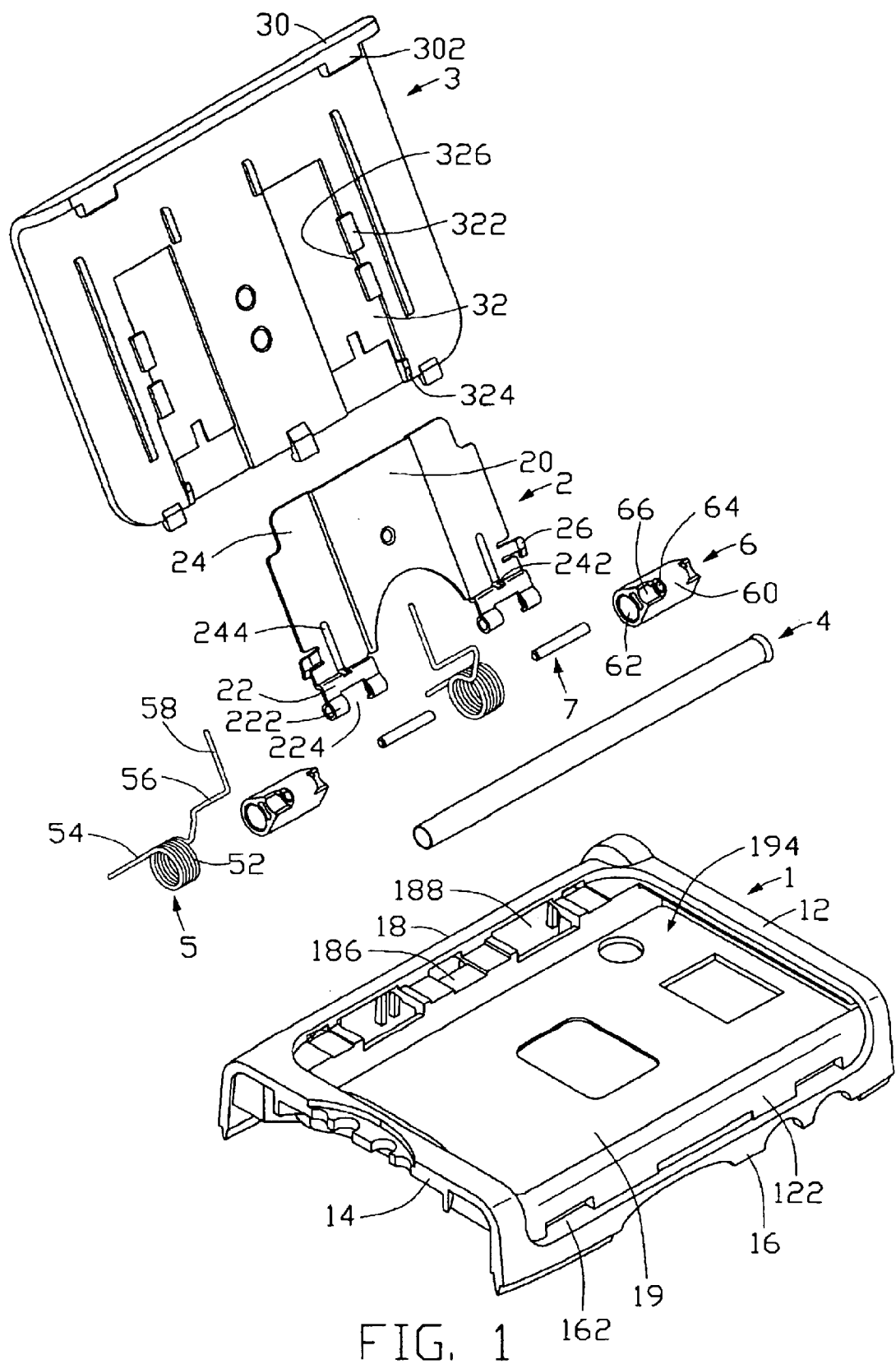
FIG. 1 is an exploded, isometric view of a battery cover assembly in accordance with a preferred embodiment of the present invention.
Figure 2:
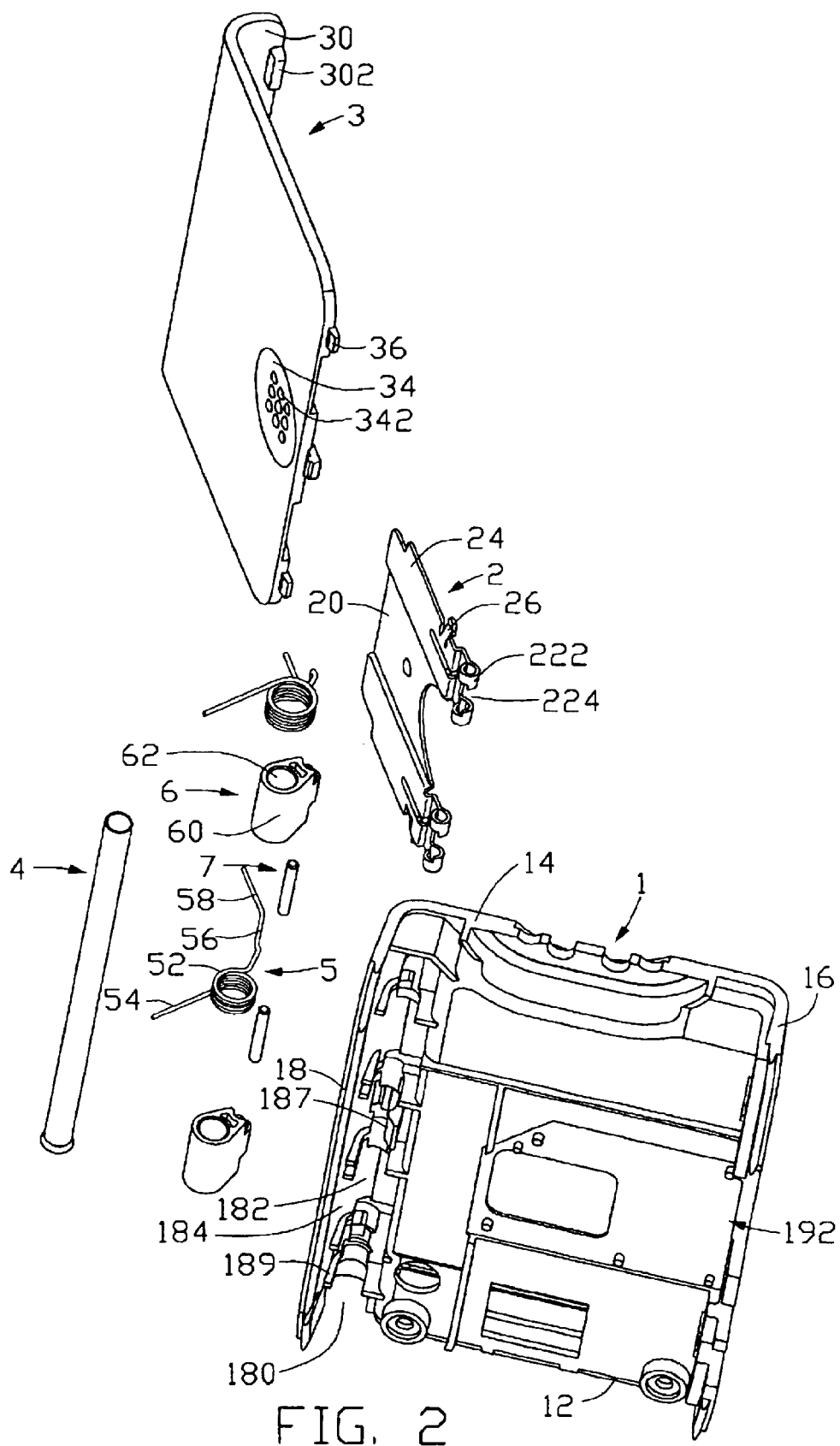
FIG. 2 is similar to FIG. 1, but viewed from another aspect.
Figure 3:
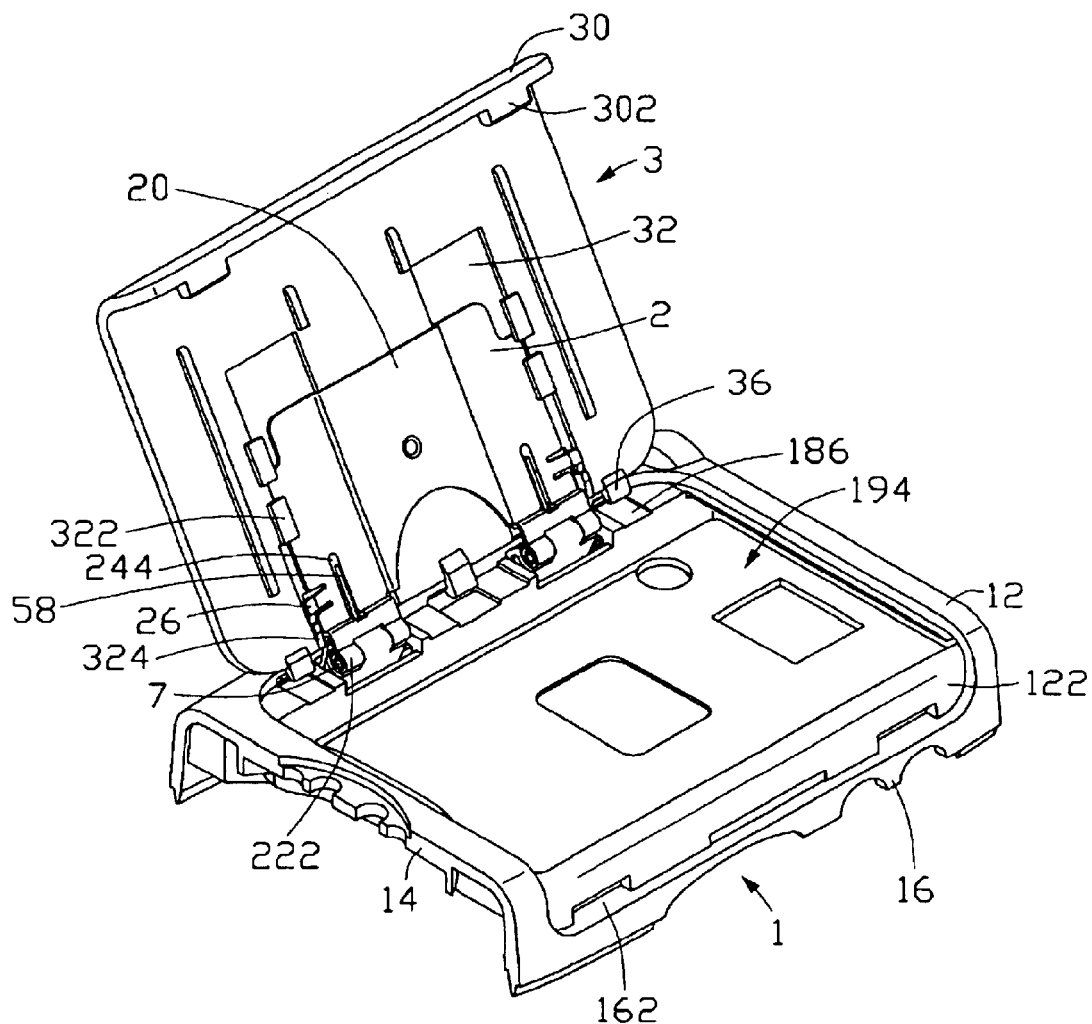
FIG. 3 is an assembled view of FIG. 1, showing a cover thereof in an open position.
Figure 4:
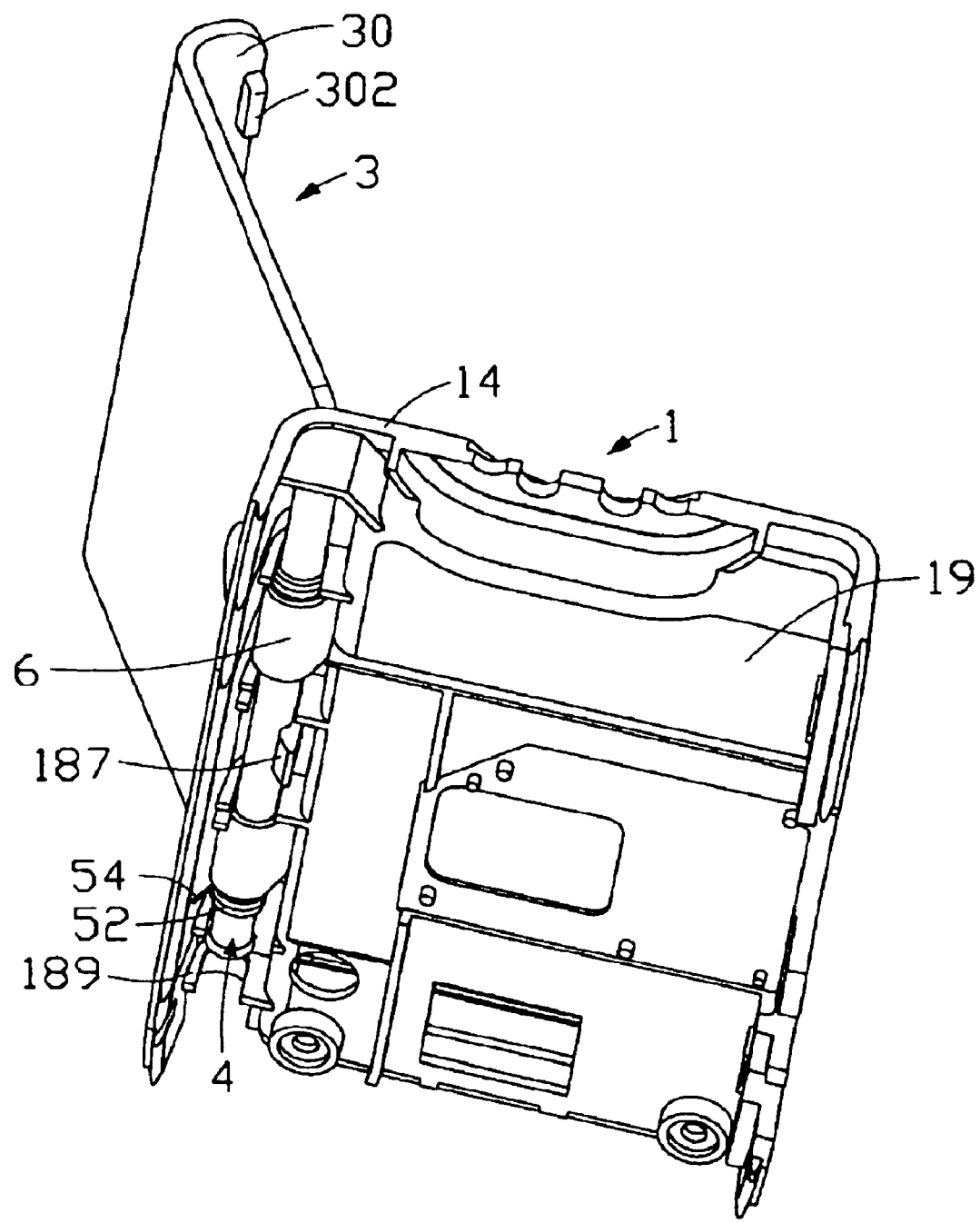
FIG. 4 is similar to FIG. 3, but viewed from another aspect.

Referring to FIGS. 1, 2 and 3, a battery cover assembly for use in a mobile phone (not shown) will be taken here as an example to disclose details according to a preferred embodiment of the present invention. The battery cover assembly comprises a housing 1, a connecting member 2, a cover 3, an antenna rod 4, a plurality of springs 5, a plurality of sleeves 6, and a plurality of locking pins 7.

The housing 1 comprises a top wall 12, a bottom wall 14, a left sidewall 18, and a right sidewall 16 together defining a rectangular space (not labeled). The rectangular space is separated into a first compartment 192 and a second compartment 194 by a partition wall 19. The partition wall 19 is formed at an intermediate position between an upper surface (not labeled) and a lower surface (not labeled) of the housing 1. The first compartment 192 is for accommodating electronic components, such as a printed circuit board, therein after assembly of the housing 1 with other housings (not shown) of the cellular phone. The second compartment 194 is used to receive batteries or a battery package therein. The left sidewall 18 and an adjacent inner wall 182 of the housing 1 cooperatively define three mounting grooves 186, and a pair of rectangular openings 188 alternately disposed between the mounting grooves 186. A receiving slot 180 is defined in the first compartment 192 alongside the line of mounting grooves 186 and rectangular openings 188, for receiving the antenna rod 4. An elongated recess 122 is defined in an outside surface (not labeled) of the right sidewall 16. A pair of troughs 162 is defined in the right sidewall 16 at the recess 122, near the top wall 12 and the bottom wall 14 respectively. A plurality of positioning projections 187 extends down from a bottom of the inner wall into the receiving slot 180. A pair of tabs 189 extends down from the bottom of the inner wall into two opposite ends of the receiving slot 180 respectively.

The connecting member 2 is made of elastic material, such as metallic material, by way of stamping. The connecting member 2 comprises a planar main body 20, and a pair of side wings 24 extending from two opposite sides of the main body 20 respectively. The side wings 24 are in a common plane, which is higher than the plane of the main body 20. A folded portion 22 extends from a hinging end of each side wing 24. A pair of folded arms 222 is formed on an end of each folded portion 22, and a cutout 224 is defined between the folded arms 222. An elastic latch 26 extends from an outside edge portion of each side wing 24. A groove 244 is defined in each side wing 24, adjacent and perpendicular to the corresponding folded portion 22. An aperture 242 is defined through each folded portion 22, and is in communication with a corresponding groove 244.

The cover 3 is substantially rectangular, and comprises a sidewall 30 extending from a locking side thereof. Two parallel, elongated recesses 32 are defined in an inner face of the cover 3, the recesses 32 being spaced from each other a certain distance. A pair of protruding blocks 322 is formed on the inner side of the cover 3, adjacent to an outside extremity of each recess 32. The protruding blocks 322 and the recesses 32 cooperatively define a pair of guide rails 326. The guide rails 326 can slidably receive the side wings 24 of the connecting member 2. A block 324 extends from a bottom surface of each recess 32 adjacent to a hinging side of the cover 3. A distance from each block 324 to a closest top or bottom side of the cover 3 is slightly less than a distance from an outside extremity (not labeled) of the corresponding recess 32 to the same top or bottom side of the cover 3. Two locking projections 302 protrude from an inner surface of the sidewall 30, for engaging with the troughs 162 of the housing 1. A circular pressing portion 34 is formed on an outside surface of the cover 3, adjacent to the hinging side of the cover 3. A plurality of gripping protrusions 342 is formed on an outside surface of the pressing portion 34. Three mounting protrusions 36 extend from the hinging side of the cover 3.

The antenna rod 4 is hollow, and is secured within the receiving slot 180 by a positioning means (not shown). The antenna rod 4 is of the kind found in many portable electronic devices that have antennas.

Each spring 5 comprises a coil-shaped body 52, a straight first arm 54 extending from one end of the coil-shaped body 52 in a direction parallel to an axis of the coil-shaped body 52, and a zigzagged second arm (not labeled) extending from an opposite end of the coil-shaped body 52. The second arm comprises an intermediate beam 56 parallel to the axis of the coil-shaped body 52, and an end portion 58 substantially perpendicular to the beam 56.

Each sleeve 6 comprises a main body 60, a first through hole 62, and a second through hole 64. The first through hole 62 is defined through a major portion of the main body 60. The second through hole 64 is defined through a peripheral portion of the main body 60 adjacent to the first through hole 62. A pair of cutouts 66 is defined in the peripheral portion of the main body 60, at respective opposite ends of the of sleeve 6 and in communication with the second through hole 64.

In assembly, the connecting member 2 is attached to the cover 3, with the side wings 24 being inserted into the guide rails 326. During the course of inserting the side wings 24 into the guide rails 326, the elastic latches 26 of the side wings 24 ride over and are deflected by the blocks 324. The elastic latches 26 snap back to their original positions once the side wings 24 have been completely received in the guide rails 326. The guide rails 326 are slightly longer than the side wings 24, so that the connecting member 2 can slide back and forth relative to the cover 3 over a small range. However, the connecting member 2 is prevented from sliding out from the guide rails 326, because the elastic latches 26 are blocked by the blocks 324.

The antenna rod 4 is inserted through the springs 5 and the first through holes 62 of the sleeves 6sleeve. The combined antenna rod 4, springs 5 and sleeves 6 is positioned in the receiving slot 180 between the positioning projections 187 and the tabs 189. The sleeves 6 are received in the rectangular openings 188. The springs 5 are arranged so that sleeve the first arms 54 abut against the tabs 189, and the second arms 56 extend through the rectangular openings 188 to an outside of the left sidewall 18. As a result, the beams 56 of the second arms are located over the sleeves 6. The antenna rod 4 is thus secured in the receiving slot 180 by the sleeves 6, the springs 5, the positioning projections 187, and the tabs 189.

Then the folded arms 222 of the connecting member 2 are received in the cutouts 66 of the sleeves 6. The end portions 58 of the springs 5 are inserted through the apertures 242 of the connecting member 2 and secured in the grooves 244. A common axis of the folding arms 222 is aligned with a common axis of the second through holes 64 of the sleeves 6. The locking pins 7 are inserted through the folded arms 222 and through the corresponding second through holes 64. A diameter of each locking pin 7 is slightly greater than that of each second through hole 64, therefore a tool is required for the insertion of the locking pins 7.

Figure 5:
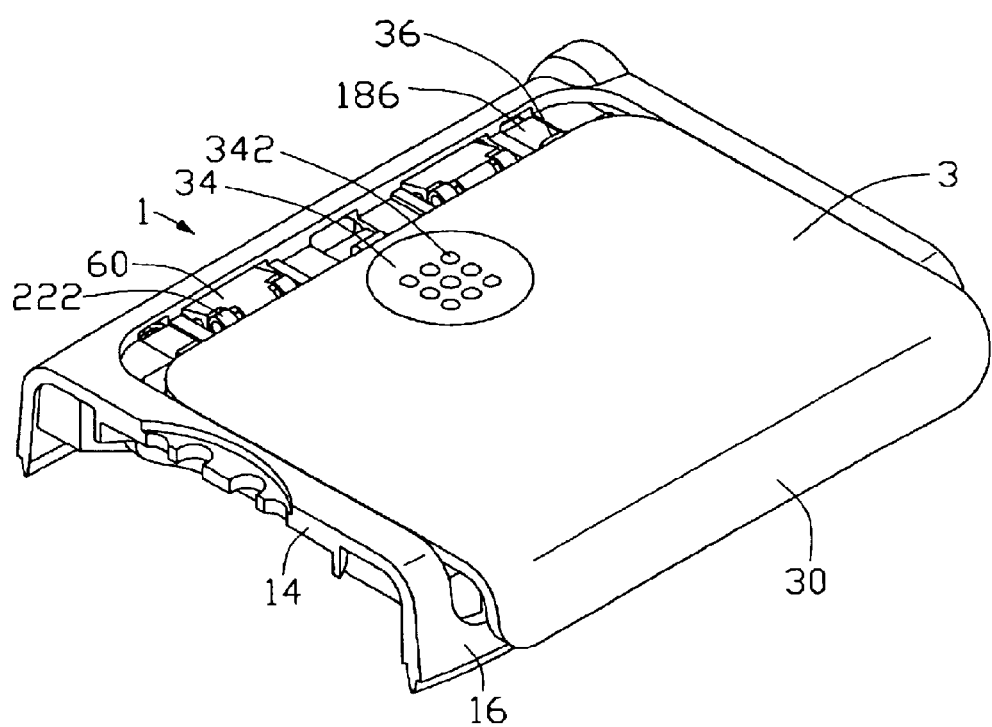
FIG. 5 is similar to FIG. 3, but showing the cover in an unlocked position.
Figure 6:
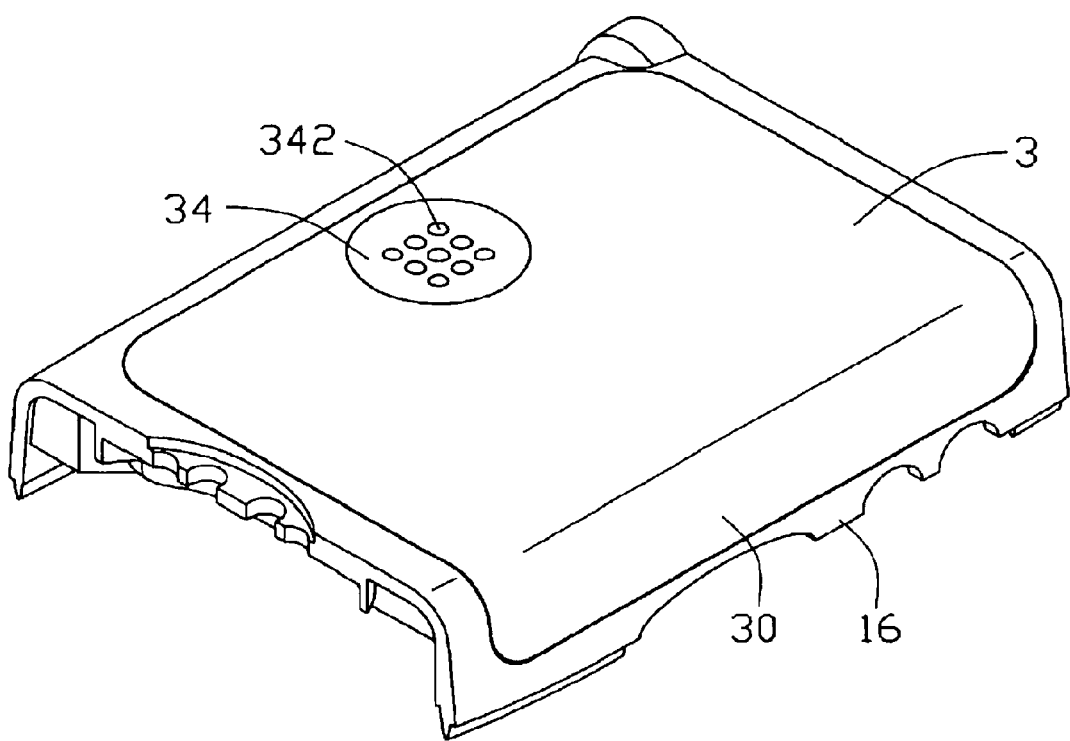
FIG. 6 is similar to FIG. 5, but showing the cover is in a closed position.

Referring to FIG. 3, in use, the cover 3 is located in an open position, and a battery package (not shown) is put into the second compartment 194. The combined cover 3 and connecting member 2 is rotated downwardly about the antenna rod 4 to the housing 1. In this process, a certain force is required to be exerted on the pressing portion 34 of the battery cover 3 in order to apply torsion to the springs 5. When the cover 3 reaches an unlocked position as shown in FIG. 5, the housing 1 is substantially covered by the cover 3. The cover 3 is slid toward the antenna rod 4. The mounting protrusions 36 are engaged in the mounting grooves 186, the locking projections 302 are engaged with the troughs 162, and the sidewall 30 is received in the recess 122. Referring to FIG. 6, the cover 3 is thus in a locked position, and completely covers the housing 1. The battery package is thus securely retained in the second compartment 194.

To take the battery package out of the second compartment 194, the pressing portion 34 is pushed in order to slide the cover 3 away from the antenna rod 4. The mounting protrusions 36 are disengaged from the mounting grooves 186, and the locking projections 302 are disengaged from the troughs 162 once the cover 3 has moved a certain distance relative to the connecting member 2. The springs 5 rebound, and the cover 3 is rotated back up to the open position. The battery package is then easily removed from the second compartment 194.

Unlike conventional battery cover assemblies, the cover 3 of the present invention is rotatably connected to the housing 1 via the connecting member 2. When the battery package is changed, the cover 3 cannot be misplaced. In addition, opening and closing of the cover 3 is simple and convenient.

It is believed that the present invention and its advantages will be understood from the foregoing description, and it will be apparent that various changes may be made thereto without departing from the spirit and scope of the invention or sacrificing all of its material advantages. The examples hereinbefore described are merely preferred or exemplary embodiments of the invention.

We claim:

1. A battery cover assembly for use in a portable electronic device, comprising:
   a battery cover;
   a connecting member slidably engaged with said battery cover, the connecting member including at least one folded arm;
   a housing defining a receiving slot and at least a compartment for accommodating a battery package;
   a rod member received in said receiving slot; and
   at least a sleeve engaging with said at least one folded arm, the sleeve comprising a first through hole; wherein
   said connecting member is connected to the housing by said rod member received through the first through hole of the sleeve such that said battery cover is rotatable to different positions around said rod member.

2. The battery cover assembly of claim 1, further comprising a locking pin received through the folded arm and a second through hole of the sleeve.

3. The battery cover assembly of claim 2, wherein the second through hole is defined adjacent the first through hole of the sleeve.

4. The battery cover assembly of claim 3, wherein at least one cutout is defined in an outside surface of the sleeve, and the cutout is in communication with the second through hole.

5. The battery cover assembly of claim 1, wherein said connecting member comprises a main body, and said folded arm extends downwardly at one side of said main body.

6. The battery cover assembly of claim 1, further comprising a plurality of spring members engaging with said rod member and said connecting member.

7. The battery cover assembly of claim 1, wherein said battery cover comprises a sidewall extending from one side thereof.

8. The battery cover assembly of claim 1, wherein said housing is defined by a top wall, a bottom wall, a left wall, a right wall, and a partition wall.

9. The battery cover assembly of claim 7, wherein a plurality of locking projections protrudes from an inner surface of said sidewall.

10. The battery cover assembly of claim 9, wherein an elongated recess is defined in an outside surface of the right sidewall, and a plurality of troughs is defined in said elongated recess for receiving said plurality of locking projections of said sidewall of said battery cover.

11. The battery cover assembly of claim 1, wherein an elongated recess is defined along a lateral direction in an inner side of said battery cover, and a plurality of protruding blocks protrudes from the inner side of said battery cover adjacent to said recess.

12. The battery cover assembly of claim 11, wherein a guide rail is defined by said protruding blocks and said recess.

13. A battery cover assembly for use in a portable electronic device, comprising:
    a battery cover defining at least one elongated recess;
    a connecting member being slidably engaged with said battery cover, and comprising a folded arm;
    at least one sleeve defining a first through hole and a second through hole;
    a housing comprising a plurality of sidewalls defining a receiving slot and at least one compartment for accommodating a battery package therein; and
    a rod member secured in said receiving slot; wherein
    said connecting member is engaged with said sleeve by a locking pin received in said first through hole and said folded arm clasping the locking pin, and said rod member is received through said second through hole of the sleeve and said receiving slot, whereby said battery cover is pivotably connected with said housing.

14. The battery cover assembly of claim 13, wherein a plurality of locking projections protrudes from said battery cover, and a plurality of corresponding locking troughs is defined in one of the sidewalls of said housing.

15. The battery cover assembly of claim 13, further comprising a plurality of spring members which surrounds the rod member.

16. The battery cover assembly of claim 15, wherein each of the spring members comprises a coil-shaped body, a first arm extending from an end of the coil-shaped body along a tangent thereof, and a second arm extending from the other end of the coil-shaped body.

17. The battery cover assembly of claim 13, further comprising a locking pin received through the folded arm and the second through hole of the sleeve.

18. The battery cover assembly of claim 17, wherein the second through hole is defined adjacent the first through hole of the sleeve.

19. The battery cover assembly of claim 18, wherein at least one cutout is defined in an outside surface of the sleeve, and the cutout is in communication with the second through hole.

20. The battery cover assembly of claim 13, wherein said connecting member comprises a main body, and said folded arm extends downwardly from a side of said main body.

21. A battery cover assembly for use in a portable electronic device, comprising:
    a battery cover;
    a connecting member being slidably engaged with said battery cover;
    at least one sleeve defining a main pivotal axis and a secondary pivotal axis aside said main pivotal axis in a parallel relation;
    a housing comprising at least one compartment for accommodating a battery package therein, said at least one sleeve fixedly retained in the housing without rotation; and
    a rod member extending through the main pivotal axis;
    said connecting member pivotally connected to the at least one sleeve about
    said secondary pivotal axis, and
    a biasing device located about said rod member and defining one end abutting against the connecting member and another end abutting against the housing so as to constantly urge the connecting member away from the housing when said battery cover is not locked to the housing.

* * * * *